United States Patent
Ragland

(10) Patent No.: US 8,606,619 B2
(45) Date of Patent: Dec. 10, 2013

(54) MARKET SEGMENTATION AND SALES POTENTIAL MODEL FOR ANIMAL RELATED PRODUCTS

(75) Inventor: Chris Ragland, Salisbury, MD (US)

(73) Assignee: Animalytix, Salisbury, MD (US)

( * ) Notice: Subject to any disclaimer, the term of this patent is extended or adjusted under 35 U.S.C. 154(b) by 61 days.

(21) Appl. No.: 13/194,459

(22) Filed: Jul. 29, 2011

(65) Prior Publication Data

US 2013/0030866 A1   Jan. 31, 2013

(51) Int. Cl.
 *G06Q 30/00*   (2012.01)
 *G06Q 10/00*   (2012.01)

(52) U.S. Cl.
 USPC ....... 705/7.31; 705/7.33; 705/7.34; 705/7.35; 705/7.36

(58) Field of Classification Search
 CPC ............. G06Q 30/0202; G06Q 30/02; G06Q 30/0201; G06Q 10/087; G06Q 10/06
 USPC ................................. 705/7.33, 7.34
 See application file for complete search history.

(56) References Cited

U.S. PATENT DOCUMENTS

| | | | | |
|---|---|---|---|---|
| 7,681,527 | B2 * | 3/2010 | Pratt | 119/174 |
| 7,810,451 | B2 * | 10/2010 | Pratt | 119/174 |
| 7,836,850 | B2 * | 11/2010 | Pratt | 119/174 |
| 8,037,846 | B2 * | 10/2011 | Pratt | 119/174 |
| 2003/0061096 | A1 * | 3/2003 | Gallivan et al. | 705/14 |
| 2003/0195792 | A1 * | 10/2003 | Thompson et al. | 705/10 |
| 2009/0151644 | A1 * | 6/2009 | Valencia et al. | 119/51.02 |
| 2012/0203678 | A1 * | 8/2012 | Sutter et al. | 705/34 |

OTHER PUBLICATIONS

USDA, Veterinary Services, Baseline Reference of Feedlot Management Practices, 1999, May 2000 http://wayback.archive.org/web/20060801000000*/http://nahms.aphis.usda.gov/feedlot/feedlot99/FD99Pt1.pdf.*
Animalytix Market Survey, Animalytix webpages, Jan. 2011 http://www.animalytix.net/about-2/animalytix-in-action-2/.*
Animalytix in Action, Case Study 2, Animalytix webpages, 2011 http://www.animalytix.net/index.php/download_file/view/185/96/.*
Market Penetration Definition by Investopedia http://www.investopedia.com/terms/m/market-penetration.asp#axzz2AziCF2HX.*

* cited by examiner

*Primary Examiner* — Lynda Jasmin
*Assistant Examiner* — Octavian Rotaru
(74) *Attorney, Agent, or Firm* — TraskBritt

(57) ABSTRACT

A method, system, and apparatus for estimating potential sales of animal products based on estimated animal population determined from a transaction history of sentinel products associated with particular animals. A set of sentinel products is determined that is associated with a specific type of animal. A number of the type of animal in a geographic region is estimated based on a transaction history associated with the set of sentinel products. A potential sales estimate for the geographic region is determined based on the estimated number of the particular type of animal in the geographic region.

15 Claims, 6 Drawing Sheets

US 8,606,619 B2

MARKET SEGMENTATION AND SALES POTENTIAL MODEL FOR ANIMAL RELATED PRODUCTS

TECHNICAL FIELD

Embodiments of the present disclosure relate to market analysis and, more specifically, to analyzing and projecting market sales potentials and opportunities for animal product markets.

BACKGROUND

Modern business practices typically include methods for analyzing market conditions. Such tools may attempt to use market sales data to determine things such as sales potential or sales opportunity that may be available in a particular market. Typically, the more information available to a company, the better able the company is to analyze the market data. Many companies now use sophisticated methodologies and process large amounts of data in order to analyze and predict market behavior and opportunities.

However, as the amount of market data grows, and as the market data is analyzed with regard to specific market areas, it is apparent that improved methods are needed for analyzing market data. For example, in the animal health market, information such as sales data may be available to a company for analysis. However, there is hidden information not directly included in the sales data that may be determined from extrapolations based on the sales data. Conventional market analysis tools in the animal health market have thus far failed to adequately process and utilize hidden information that may be determined from market sales data.

SUMMARY OF INVENTION

A method, system, and apparatus are provided for estimating potential sales of animal products based on estimated animal population determined from a transaction history of sentinel products associated with particular animals. A set of sentinel products is determined that is associated with a specific type of animal. A number of the type of animal in a geographic region is estimated based on a transaction history associated with the set of sentinel products. A potential sales estimate for the geographic region is determined based on the estimated number of the particular type of animal in the geographic region.

DETAILED DESCRIPTION

Figure 1:
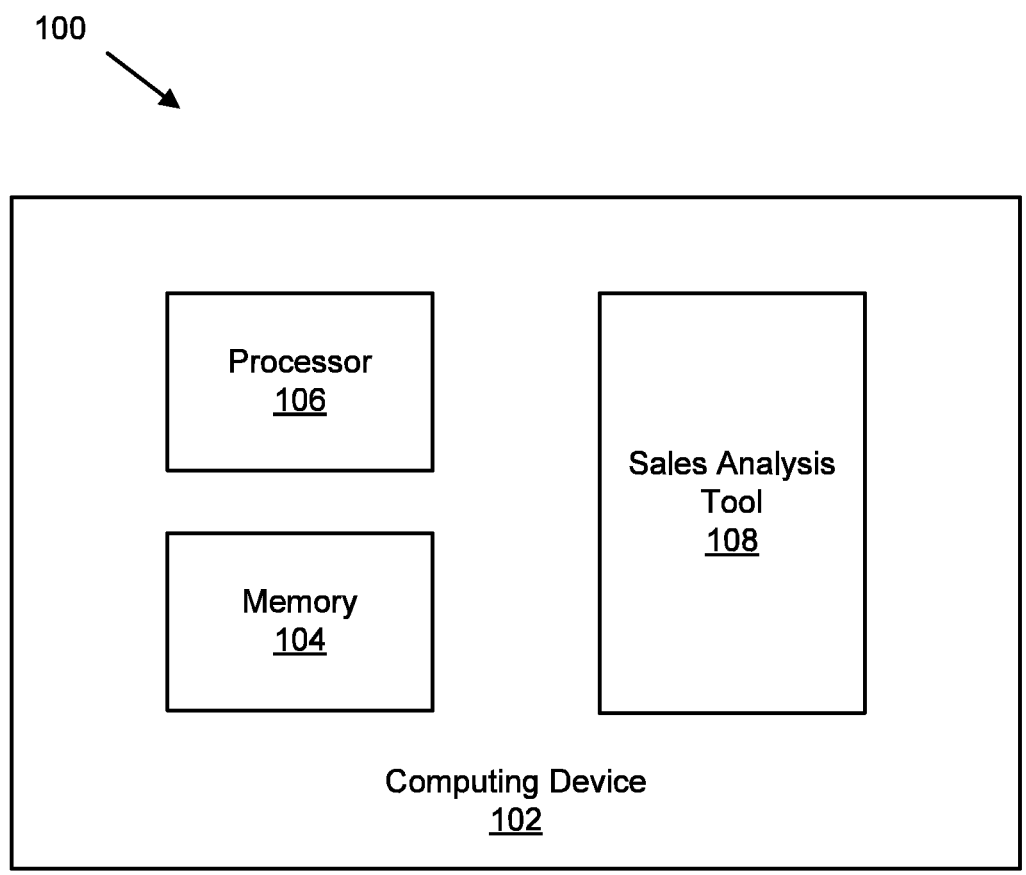
FIG. 1 is a schematic block diagram illustrating one embodiment of a system for a market segmentation and sales potential model for animal related products.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

In the following detailed description, reference is made to the accompanying drawings, which form a part hereof, and in which is shown, by way of illustration, specific embodiments in which the invention may be practiced. These embodiments are described in sufficient detail to enable a person of ordinary skill in the art to practice the invention. However, other embodiments may be utilized, and structural, logical, and electrical changes may be made without departing from the scope of the invention. The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designation.

The term "sentinel products" as used herein refers to products that are commonly associated with a specific type of animal or type of animal product user. For example, a certain product or group of products may be used specifically for treating and caring for dairy cows, whereas a different product or set of products may be used specifically for treating and caring for horses. In some embodiments, these sentinel products may be uniquely associated with a particular type of animal or animal product user.

FIG. 1 depicts one embodiment of a system 100 for implementing a market segmentation and sales potential model for animal related products. The system 100 includes a computing device 102 that includes a memory 104 and a processor 106. As will be recognized by one of skill in the art, the computing device 102 may be a device such as a personal computer, laptop, client, server, personal digital assistant, cell phone, or the like. The computing device 102 includes a sales analysis tool 108 that is configured to perform the logic necessary to implement the market segmentation and sales potential model. In various embodiments, the sales analysis tool 108 may be installed on the computing device 102, accessed on an external device such as on a web server, stored on a computer readable media, or may be implemented on the computing device 102 using other computer processing techniques known in the art. Generally, the sales analysis tool 108 is configured to perform the logic necessary to analyze, evaluate, and output information about the sales potential of products related to specific animal populations in a geographic region.

In one embodiment, the sales analysis tool 108 uses transactional data associated with animal related products to estimate the size and makeup of one or more animal populations in a geographic region. The sales analysis tool 108 may utilize the information related to the estimated size and makeup of the animal populations to determine a potential sales estimate for animal related products in the geographic region. For example, the sales analysis tool 108 may identify a set of sentinel products associated with a particular type of animal (e.g. horse, beef cow, dairy cow, sow/gilt, finishing swine, stocker, feedlot steer, feedlot heifer, cat, dog goat, sheep, etc.). Transactional data related to the sale of sentinel products may be used by the sales analysis tool 108 to extrapolate information about the population of the particular type of animal in a particular geographical region (e.g. if a certain number of sentinel products are purchased each year in a geographical region, the population size for the animals that in that geographic region may be estimated.) The extrapolated information about the animal population may then be used to estimate a sales potential for animal specific products within the geographic region. The sales potential information may be provided to distributors or retailers to make marketing and business related decisions. Similarly, the sales analysis tool 108 may extrapolate other information related to the sale of animal products such as the type and number of product vendors and consumers. Such information may be used to extrapolate additional information such as market shares and the like.

Figure 2:
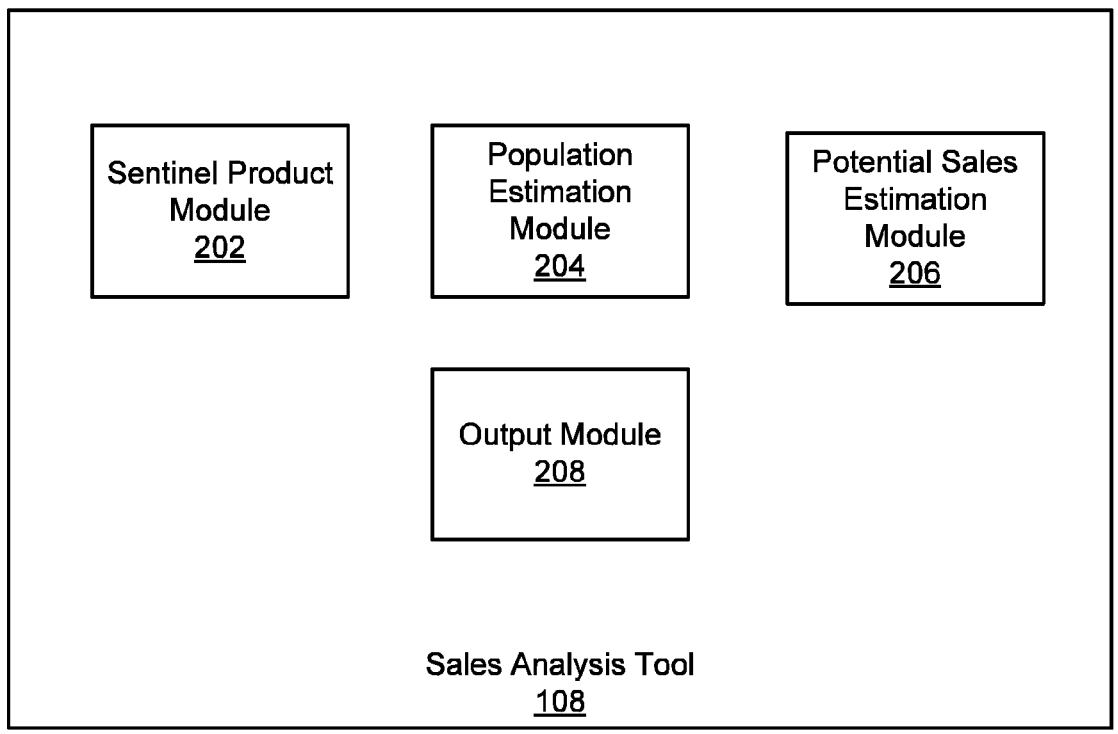
FIG. 2 is a schematic block diagram illustrating one embodiment of a sales analysis tool for a market segmentation and sales potential model for animal related products.

FIG. 2 depicts one embodiment of the sales analysis tool 108 that includes a plurality of logic modules. In the depicted embodiment, the sales analysis tool 108 includes a sentinel product module 202, a population estimation module 204, a potential sales estimation module 206, and an output module 208.

The sentinel product module 202 determines a set of sentinel products that are associated with a specific type of animal, such as a dairy cow. The sentinel product module 202 may receive input data, for example, from a user, from a database, from a sentinel product definitions table, or the like that can be used to identify a set of sentinel products associated with a particular animal type. For example, in one embodiment, a user may be prompted to input a set of products that are associated with a dairy cow. In another embodiment, a listing of products associated with a dairy cow may be included and stored in a database. The data may then be accessed and retrieved by the sentinel product module 202. In various embodiments, some products may be more highly correlated with a specific type of animal than other products. Thus, a rating and/or ranking may be used to identify the most highly correlated products. The rating and/or ranking may then be used to identify a set of sentinel products.

In one embodiment, the sentinel product module 202 may be configured to require the identification of a predetermined number of products in order to adequately correlate the sentinel products to specific type of animal. For example, a user may be required to specify at least 3 sentinel products that are highly correlated with a dairy cow. In a further embodiment, a user may be required to specify more sentinel products to add to the set of sentinel products depending on a correlation rating or ranking of the products. For example, a user may be required by the sentinel product module 202 to specify ten medium correlated sentinel products or three highly correlated sentinel products in order to form an accepted set of sentinel products.

The population estimation module 204 is configured, in one embodiment, to utilize a transaction history related to the sale of the set of sentinel products to determine a number of the type of animal in a geographic region. For example, a transaction history may be retrieved from known animal product distributors that supply the geographic region with the selected sentinel products. The transaction history may include information such as the number of sales of the sentinel products in the geographic region and the number of animals logically associated with each sale of each sentinel product. From the transaction history, the population estimation module 204 may determine how many products have been sold in the geographic region, and from the determined number of products sold in the region, may estimate how many animals are currently living in the geographic region. For example, if a sentinel product set is used that includes a vaccine that is required to be given yearly to dairy cows, then the number of vaccines consumed per year in the geographic region provides an estimate of the number of dairy cows in the geographic region. Using several such products with different usage characteristics may increase the accuracy of the population estimates. In various embodiments, the geographic region may be defined by various indicators, including but not limited to, zip code, county, census block, city, state, or the like.

In a further embodiment, the population estimation module 204 may also determine additional market characteristics associated with animal populations. For example, the population estimation module 204 may determine how many animal product retailers or how many product end users are present in the geographic area. Such information may be extrapolated from the transaction history and may be used to provide information about the market such as market share estimations and the like.

The potential sales estimation module 206 may be configured, in one embodiment, to determine a potential sales estimate for the geographic region based on the estimated number of the particular type of animal. Once an accurate estimation of the population of the target animal and/or animals is determined, that information may be used to perform market analytics based on the estimated population. For example, if it is estimated that a certain number of dairy cows reside in the geographic region, then it may be determined whether there is a potential for additional sales of products related to dairy cows, including the sale of non-sentinel products. In one embodiment, the potential sales estimation module 206 may utilize the previously mentioned transaction history (or additional data as provided by a retailer or distributor) to determine a total available market share for a certain product or set of products (e.g. products related to a dairy cow) and to compare the total market share to the market share currently held by the retailer or distributor. This information may be provided to a user as a potential sales estimate.

As used herein, a potential sales estimate refers to data, information, depictions, or the like that provide information about the potential sale of products related to an animal type and/or animal product user associated with a set of sentinel products. The potential sales estimate may include, but is not limited to, information such as a projected total sales opportunity per market segment (e.g. ruminant vaccines), reports of total sales potentials by product type and/or product groups, and reports of sales potential per customer type. This information may be provided to subscribers or other users.

The output module 208 may be configured to output the potential sales estimate. Outputting the potential sales estimate may include, but is not limited to, providing a printout of the potential sales estimate, displaying the potential sales estimate on a display, storing the potential sales estimate in a memory, storing the potential sales estimate in a database, or the like.

Figure 3:
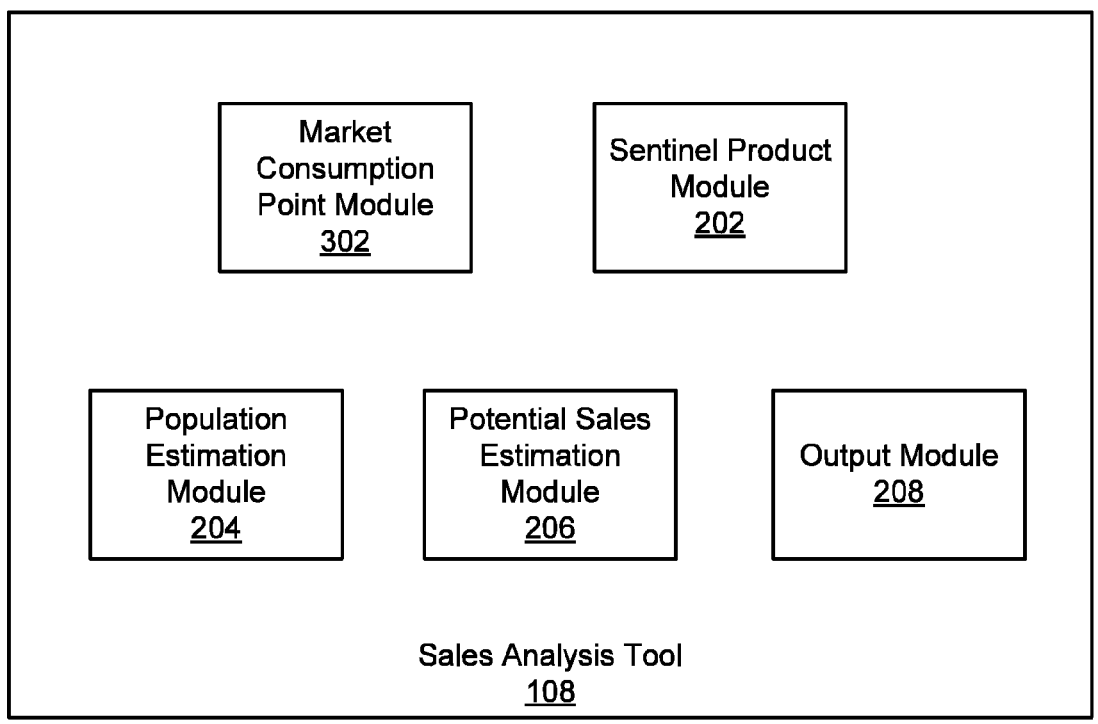
FIG. 3 is a schematic block diagram illustrating a further embodiment of a sales analysis tool for a market segmentation and sales potential model for animal related products.

FIG. 3 depicts another embodiment of the sales analysis tool 108 that includes a plurality of logic modules. In the depicted embodiment, the sales analysis tool 108 includes a market consumption point module 302, a sentinel product module 202, an animal population estimation module 204, a potential sales estimation module 206, and an output module 208. Generally, the embodiment of FIG. 3 operates similarly to the operation of the embodiment depicted in FIG. 2, except that the embodiment of FIG. 3 includes the market consumption point module 302. Of course, fewer or more modules may be utilized in various embodiments and/or one or more modules may be combined together or otherwise reconfigured as will be recognized by one of skill in the art.

In one embodiment, the market consumption point module 302 identifies each product destination point in the geographic region as a market consumption point. A market consumption point may be identified, for example, by a shipped to address or a latitude/longitude position as provided by the transaction history provided by the product distributors. In one embodiment, a market consumption point may include a consolidated list of "ship-to" locations (delivery points) within a predefined radius, such as within a 100 meter radius. Thus, each delivery point with the 100 meter radius may be consolidated as a single market consumption point. Once each market consumption point is identified, the market consumption point module 302 may generate a purchasing profile for each market consumption point. The purchasing profile is based on a history of purchases of identifying products made by each market consumption point.

The market consumption point module 302, in one embodiment, determines a "customer type" for each market consumption point based on its purchasing profile. Examples of customer types may include, but are not limited to, cow-calf producer, dairy producer, feedlot operator, equine vet, swine vet, mixed vet, retail outlet, small animal vet, and swine producer. In some embodiments, the market consumption point module 302 generates a "matching ratio" between each market consumption point and various customer identifying sets of products associated with each defined customer type. The matching ratio may be used to assign each market consumption point a customer type. For example, a matching ratio may indicate that a particular market consumption point is an equine vet based on a transaction history that indicates purchases of equine products that are commonly purchased by an equine vet. An example of a matching ration between a consumption point and customer types is provided in Table 1.

TABLE 1

| | | |
|---|---|---|
| Market Consumption Point #1 (customer type ratios) | Dairy Producer | 90% |
| | Cow-Calf Producer | 70% |
| | Feedlot Operator | 35% |
| | Mixed Vet | 35% |
| | Ag Retail Outlet | 20% |
| | Equine Vet | 15% |
| | Swine Vet | 5% |
| | Small Animal Vet | 5% |
| | Swine Producer | 5% |

As seen in Table 1, the market consumption point #1 includes a matching ratio 90% to the customer type "Dairy Producer" and a matching ratio of 70% to the customer type "Cow-Calf Producer". Thus, because the market consumption point #1 has the highest matching ratio to a Dairy Producer, the market consumption point module 302 may determine that the market consumption point #1 is of the customer type "Dairy Producer." The market consumption point #1 has a low matching ratio to the customer types "Swine Producer" (5%) and "Small Animal Vet" (5%), so the market consumption point module 302 will not likely identify the market consumption point #1 as one of those customer types.

The potential sales estimation module 206 may be further configured to determine a ratio of animals to customer type in the geographic region based on the number of animals determined by the population estimation module 204. For example, if it is determined that a market consumption point is an equine vet, the potential sales estimation module 206 may use an estimated population of horses made by the population module 204 to determine that there are 500 horses in the geographic region for each equine vet. From this information, additional market analytics may be performed such as determining the market share of each equine vet for a particular product and estimating a sales potential per customer type for the geographic region. For example, the potential sales estimation module 206 may project a total sales opportunity per market segment (e.g. ruminant vaccines) in the geographic region, may provide reports of total sales potentials by product type and/or product groups, and/or may provide reports of sales potential per customer type.

Figure 4:
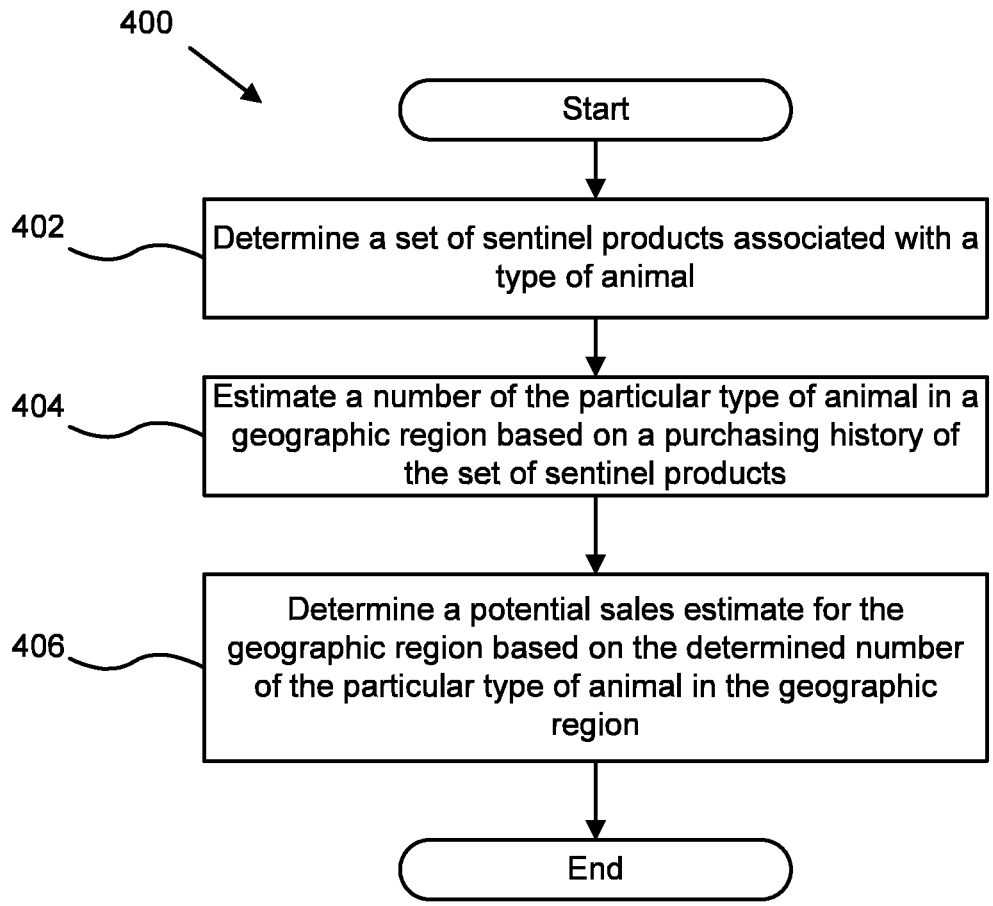
FIG. 4 is a flow chart diagram illustrating one embodiment of a method for implementing a market segmentation and sales potential model for animal related products.

FIG. 4 is a flow chart diagram illustrating one embodiment of a simplified method 400 for implementing a market segmentation and sales potential model for animal related products. The method 400, in one embodiment, may include the various embodiments, modules, and functions described above with regard to the system 100. The method 400 begins when a sentinel product module 202 determines 404 a set of sentinel products that are associated with a type of animal and/or animal product user. Next, a population estimation module 204 estimates 404 a number of the particular type of animal in a geographic region based on a purchasing history of the set of sentinel products. Finally, a potential sales estimation module 206 determines a potential sales estimate for the geographic region based on the determined number of the particular type of animal in the geographic region.

Figure 5:
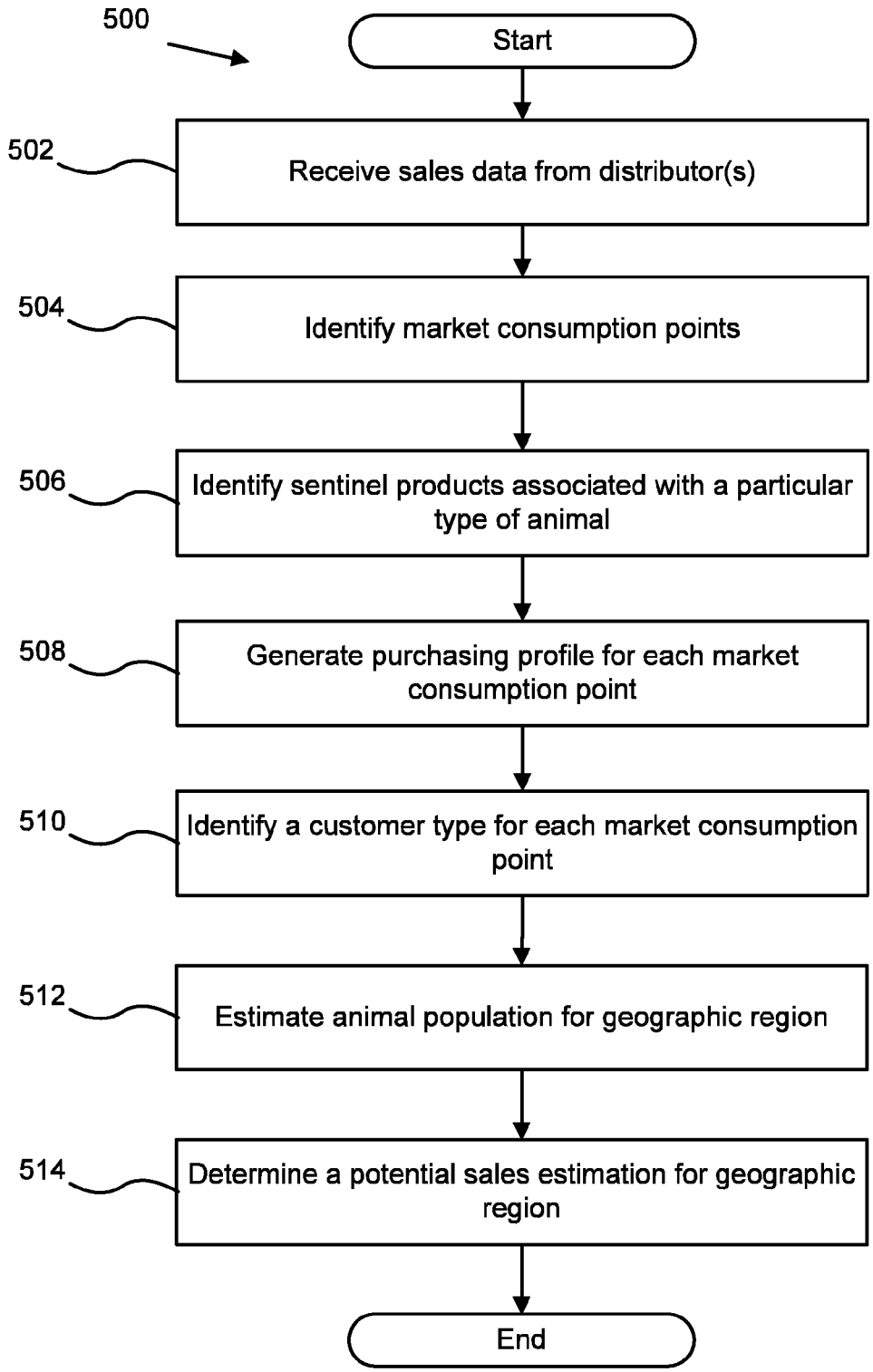
FIG. 5 is a flow chart diagram illustrating a further embodiment of a method for implementing a market segmentation and sales potential model for animal related products.

FIG. 5 is a flow chart diagram illustrating a further embodiment of a method 500 for implementing a market segmentation and sales potential model for animal related products. The method 500 includes a simplified embodiment of analyzing a market of a specific product based on information extrapolated by the sales analysis tool 108 as described above.

The method 500 begins by receiving 502 sales data from one or more animal product distributors. A market consumption point module 302 identifies 504 one or more market consumption points based on the customer sales data. Next, a sentinel product module 202 identifies 506 a set of sentinel products that are associated with a specific type of animal and/or animal product user. The market consumption module 302 generates 508 a purchasing profile for each market consumption point. Then, the market consumption module 302 identifies 510 a customer type for each market consumption point. A population estimation module 204 estimates 512 a population of the particular type of animal in the geographic region based on a transaction history of the set of sentinel products. Finally, a potential sales estimation module 206 determines a potential sales estimate for the geographic region based on the determined number of the particular type of animal in the geographic region.

Figure 6:
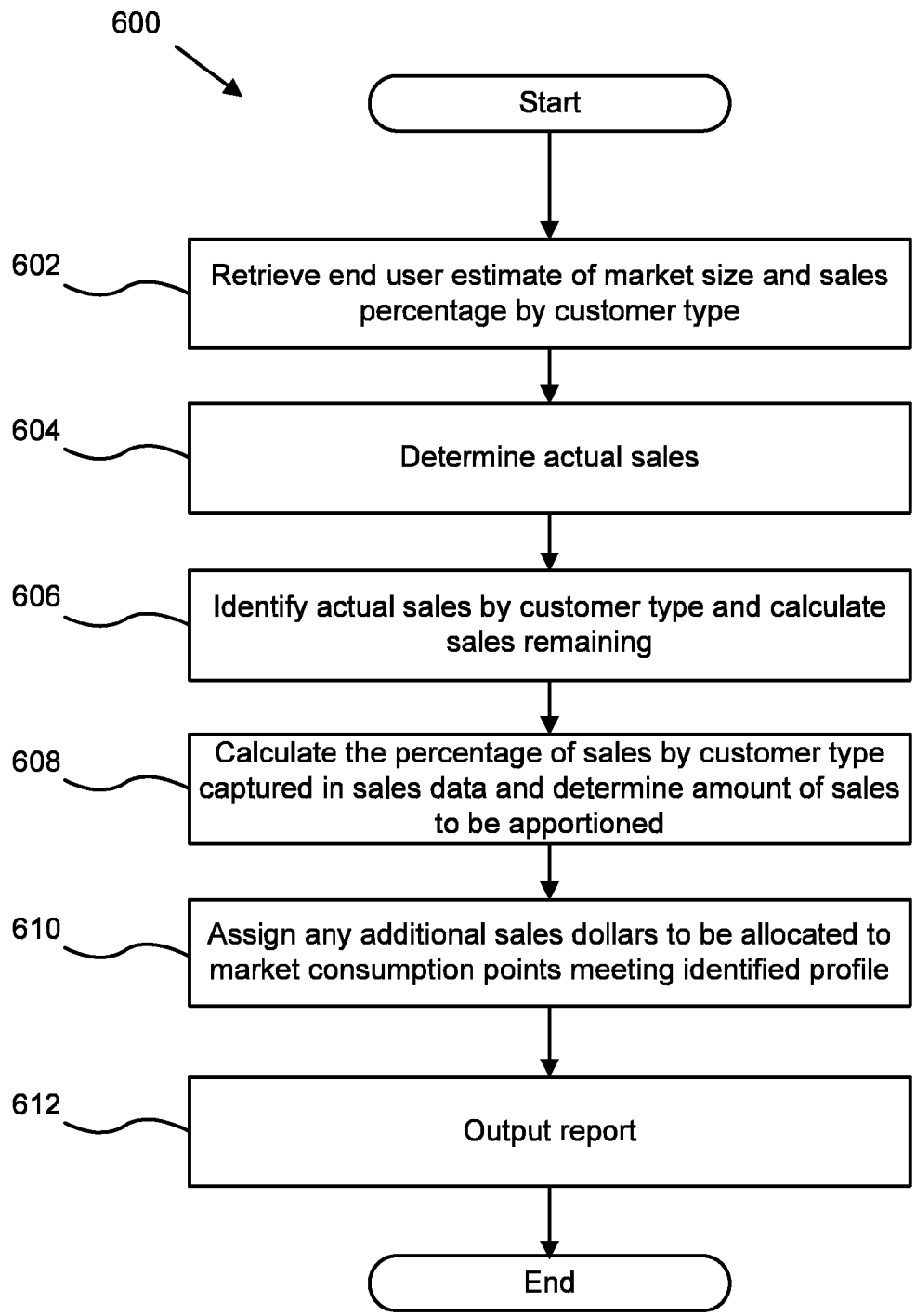
FIG. 6 is a flow chart diagram illustrating one embodiment of a method for providing a client guided enrichment process for sales extrapolations.

FIG. 6 is a schematic block diagram illustrating one embodiment of a method 600 for providing a client guided enrichment process for sales extrapolations. The method 600 may use sales data and estimates provided by an end user (e.g. client, subscriber) in conjunction with the actual sales data and estimations utilized by the sales analysis tool 108 to analyze and provide information about a particular market.

The method 600 begins an end user's estimation of the market size for a particular product or set of products in a geographic region is retrieved 602. The end user's estimated sales percentage by customer type is also retrieved 602. By way of example, the end user may provide a market estimate for a cattle penicillin injection in the geographic region of about $100 million. The end user may further provide sales percentages by customer type of 30% for cow/calf producers, 40% for feedlot operators, 20% for agriculture retail outlets, and 10% for dairy producers. In one embodiment, an input template may be provided to the end user to prompt input of information regarding a target animal health market.

Based on information collected by the sales analysis tool 108, the sales analysis tool 108 determines 604 known actual sales of the particular product based on actual sales data retrieved by the sales analysis tool 108. To continue the example, the sales analysis tool 108 may determine 604 actual sales of $70 million for the cattle penicillin injections in the geographic region. The sales analysis tool 108 may also identify 606 the amount of sales by customer type for those customer types of interest to the end user. For example, the sales analysis tool 108 may identify 606 actual sales of $20 million for cow/calf producers, $26 million for feedlot operators, $10 million for agriculture retail outlets, and $3 million for dairy producers. This totals only $59 million of the $70 million in total actual sales, because other customer types may also sell the cattle penicillin injections. The sales analysis tool 108 may then identify 606 remaining potential sales of $41 million based on the end user's $100 million market size estimate for the identified customer types.

Next, the sales analysis tool 108 calculates 608 a percentage of sales by customer type captured in the actual sales data and determines 608 an amount of sales to be apportioned to meet the end user's estimated sales percentage by customer type. For example, if the sales analysis tool 108 identified 606 actual sales of $20 million out of $100 million in estimated market size for cow/calf producers, then that $20 million includes 20% of the estimated available sales in the market. However, the end user estimated a percentage of sales available to cow/calf producers at 30%, or $30 million of the $100 million estimate. Therefore, $10 million remains in estimated unrealized sales potential for apportionment to cow/calf producers. Thus, by way of example, the sales analysis tool 108 may determine 608 an amount of sales to be apportioned by customer type as follows: $10 million for cow/calf producers, $14 million for feedlot operators, $10 million for agriculture retail outlets, and $7 million for dairy producers.

Next, the sales analysis tool 108 may assign 610 the sales dollars to be allocated to specific market consumption points meeting the identified customer type profiles on a pro rata basis. In one embodiment the pro rata apportionment base may be based on a total number of animals associated with each market consumption point. For example, if there are two market consumption points of the customer type cow/calf producer, and there is $10 million in potential sales to allocate where the first cow/calf producer is associated with an estimated cattle population of 7,000 and the second cow/calf producer is associated with an estimated cattle population of 3,000, then the first cow/calf producer may be assigned $7 million of the potential sales and the second cow/calf producer may be assigned $3 million of the potential sales. In further embodiments, additional factors may be used such as dose ratio per animal type treated by each customer.

Finally, sales analysis tool 108 outputs 612 a report to the end user. In one embodiment, the report may be an extrapolated report, based on a combination of end user inputs (e.g. estimated market size, estimated sales percentage by customer type, and dose ratio per animal type treated by each customer) and actual data available to the sales analysis tool 108 (e.g. total actual sales, actual sales by customer type, and estimated animal populations in a geographic region). Of course, in further embodiments, additional data may be used and included in the report.

These methods may be practiced in some embodiments with fewer steps or in a different order than are shown. It is thus apparent that a novel and unobvious market analysis method and apparatus has been described in a variety of embodiments. Many additions, deletions, and modifications to the preferred embodiments may be made without departing from the scope of the invention as hereinafter claimed. Further, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

CONCLUSION

Disclosed herein are a method, system, and apparatus for estimating potential sales of animal products. The method, in one embodiment, includes determining a set of sentinel products that are associated with a type of animal; estimating a number of the type of animal in a geographic region based on a transaction history associated with the set of sentinel products; and determining a potential sales estimate for the geographic region based on the estimated number of the particular type of animal in the geographic region.

The method in a further embodiment may include identifying one or more market consumption points in the geographic region. In one embodiment, estimating the number of the particular type of animal in the geographic region may include determining an estimated number of the particular type of animal associated with each market consumption point in the geographic region. The method may also include designating at least one of the market consumption points as a predefined customer type based on a purchasing history associated with the market consumption point. In a further embodiment, designating the at least one of the market consumption points as a predefined customer type may include determining a matching ratio between the at least one of the market consumption points and a purchasing profile associated with the predefined customer type. In yet a further embodiment, each predefined customer type is associated with a purchasing profile that comprises a set of products that relate to the predefined customer type.

In one embodiment, the method may include receiving customer sales data from one or more product distributors, wherein the customer sales data comprises at least a portion of the transaction history associated with the set of sentinel products. In a further embodiment, the method may include receiving an estimate of total market sales for the at least one animal product in the geographic region; determining an amount of actual sales for the at least one animal product in the geographic region based on sales data; and determining a potential sales estimate based on a comparison of the estimated total market sales and the actual sales. In one embodiment, the method may include assigning the estimated potential sales for the at least one animal product in the geographic region to one or more market consumption points. In a further embodiment, the estimated potential sales are assigned to the one or more market consumption points based on the estimated number of the type of animal in the geographic region. In yet a further embodiment, the estimated potential sales are assigned to the one or more market consumption points based on a customer type assigned to the one or more market consumption points.

In one embodiment, the method may include outputting a report of the potential sales estimate for the geographic region. In a further embodiment, identifying one or more market consumption points may include identifying one or more destination points within a predefined area and consolidating the one or more destination points into a single market consumption point.

In one embodiment, the method includes receiving customer sales data from one or more product distributors; identifying one or more market consumption points based on the customer sales data; determining a set of sentinel products that are associated with a particular type of animal; determining a number of the particular type of animal in a geographic region based on the customer sales data associated with the set of sentinel products in the geographic region; and determining a potential sales estimate based on the determined number of the particular type of animal in the geographic region.

In a further embodiment, the method includes retrieving a market size estimate for a product and an estimated sales percentage by customer type from an end user; determining an amount of actual sales for the product based on the customer sales data; determining a percentage of actual sales for the product by customer type; determining an amount of sales to be apportioned to each customer type based on the estimated sales percentage by customer type retrieved from the end user; and assigning a portion of the amount of sales to be apportioned to each customer type to specific market consumption points based on a number of particular type of animal in the geographic region associated with each specific market consumption point.

A sales analysis tool is also disclosed that includes a sentinel product module, a population estimation module, and a potential sales module. In one embodiment, the sentinel product module determines a set of sentinel products that are associated with a type of animal. The population estimation module estimates a number of the type of animal in a geographic region based on a transaction history associated with the set of sentinel products. The potential sales estimation module determines a potential sales estimate for the geographic region based on the estimated number of the particular type of animal in the geographic region.

In a further embodiment, the sales analysis tool may include a market consumption point module that identifies one or more market consumption points in the geographic region, and an output module that outputs a report of the potential sales estimate for the geographic region. In one embodiment, the population estimation module estimates a number of the type of animal in the geographic region associated with each of a plurality of market consumption points in the geographic region.

What is claimed is:

1. A method of estimating a sales potential of a selected animal product based upon a plurality of existing sentinel products, the method comprising:
   receiving input of the plurality of the existing sentinel products that are associated with a type of animal;
   determining a predetermined number of the plurality of the existing sentinel products required to satisfy a correlation ranking associated with a type of animal;
   determining, based on the predetermined number, a sentinel products set associated with the type of animal;
   receiving a purchasing history of the sentinel products set;
   estimating a population number associated with the type of animal from the sentinel products set and the purchasing history for a geographic region;
   identifying a market consumption point of a plurality of market consumption points in the geographic region;
   determining a customer type related to the selected animal product based upon a matching ratio between the market consumption point and the sentinel products set; and
   estimating, utilizing a computer processor, the sales potential of the selected animal product per customer type for the geographic region from the estimated population number associated with the type of animal.

2. The method of claim 1, wherein estimating the population number associated with the type of animal from the sentinel products set and the purchasing history for the geographic region comprises
   determining an estimated number of the type of animal associated with each of the plurality of market consumption points in the geographic region.

3. The method of claim 1, wherein determining the customer type related to the selected animal product based on the matching ratio between the market consumption point and the sentinel products set comprises
   designating at least one of the plurality of market consumption points as a predefined customer type based on the purchasing history associated with the market consumption point.

4. The method of claim 2, wherein designating the at least one of the plurality of market consumption points as the predefined customer type comprises
   determining, by one or more computing devices, the matching ratio between the at least one of the plurality of market consumption points and a purchasing profile associated with the predefined customer type.

5. The method of claim 2, wherein the predefined customer type is associated with the purchasing profile that comprises a set of products that relate to the predefined customer type.

6. The method of claim 1, wherein receiving the purchasing history of the sentinel products set comprises
   receiving customer sales data from one or more product distributors.

7. The method of claim 1, wherein estimating, utilizing the computer processor, the sales potential of the selected animal product per customer type for the geographic region comprises determining by the one or more computing devices a potential sales estimate for the selected animal product in the geographic region.

8. The method of claim 6, wherein determining, by the one or more computing devices, the potential sales estimate for the selected animal product in the geographic region comprises:

receiving an estimate of total market sales for the selected animal product in the geographic region;

determining an amount of actual sales for the selected animal product in the geographic region based on sales data; and determining, by the one or more computing devices, the potential sales of the selected animal product based on a comparison of the estimated total market sales and the actual sales.

9. The method of claim 6, further comprising assigning, by the one or more computing devices, the potential sales estimate for the selected animal product in the geographic region to the market consumption point.

10. The method of claim 8, wherein the potential sales estimate is assigned to the market consumption point based on an estimated number of the type of animal associated with each of the plurality of market consumption points in the geographic region.

11. The method of claim 8, wherein the potential sales estimate is assigned to the market consumption point based on the customer type assigned to the market consumption point.

12. The method of claim 1, further comprising outputting, by the one or more computing devices, a report of the sales potential of the selected animal product for the geographic region.

13. The method of claim 1, wherein identifying the market consumption point comprises identifying one or more destination points within a predefined area and consolidating by the one or more computing devices the one or more destination points into a single market consumption point.

14. A system for estimating a sales potential of a selected animal product based upon a plurality of existing sentinel products, the system comprising:

one or more computer processor components programmed to receiving input of the plurality of the existing sentinel products that are associated with a type of animal;

determining a predetermined number of the plurality of the existing sentinel products required to satisfy a correlation ranking associated with a type of animal;

determining, based on the predetermined number, a sentinel products set associated with the type of animal;

receiving a purchasing history of the sentinel products set;

estimating a population number associated with the type of animal from the sentinel products set and the purchasing history for a geographic region;

identifying a market consumption point of a plurality of market consumption points in the geographic region;

determining a customer type related to the selected animal product based upon a matching ratio between the market consumption point and the sentinel products set; and estimating the sales potential of the selected animal product per customer type for the geographic region from the estimated population number associated with the type of animal.

15. A non-transitory computer readable storage medium for estimating a sales potential of a selected animal product, based upon a plurality of existing sentinel products, on which is recorded computer executable instructions that, when executed by a processor, cause the processor to execute the steps of a method comprising:

receiving input of the plurality of the existing sentinel products that are associated with a type of animal;

determining a predetermined number of the plurality of the existing sentinel products required to satisfy a correlation ranking associated with a type of animal;

determining, based on the predetermined number, a sentinel products set associated with the type of animal;

receiving a purchasing history of the sentinel products set;

estimating a population number associated with the type of animal from the sentinel products set and the purchasing history for a geographic region;

identifying a market consumption point of a plurality of market consumption points in the geographic region;

determining a customer type related to the selected animal product based upon a matching ratio between the market consumption point and the sentinel products set; and estimating, utilizing a computer processor, the sales potential of the selected animal product per customer type for the geographic region from the estimated population number associated with the type of animal.

* * * * *